United States Patent
Martin et al.

(10) Patent No.: US 11,617,358 B2
(45) Date of Patent: Apr. 4, 2023

(54) METHOD APPARATUS AND SYSTEM FOR CONTROLLING FISH

(71) Applicant: Atlantic Lionshare Limited, Hamilton (BM)

(72) Inventors: Darius Alan Martin, Hamilton (BM); Elizabeth Childs Martin, Hamilton (BM); Matthew Charles John Cook, Dexter, MI (US); Geoffrey Alan Cook, Dexter, MI (US)

(73) Assignee: Atlantic Lionshare Limited, Hamilton (BM)

( * ) Notice: Subject to any disclaimer, the term of this patent is extended or adjusted under 35 U.S.C. 154(b) by 178 days.

(21) Appl. No.: 16/755,594

(22) PCT Filed: Oct. 10, 2018

(86) PCT No.: PCT/GB2018/052897
§ 371 (c)(1),
(2) Date: Apr. 12, 2020

(87) PCT Pub. No.: WO2019/073229
PCT Pub. Date: Apr. 18, 2019

(65) Prior Publication Data
US 2021/0195881 A1     Jul. 1, 2021

(30) Foreign Application Priority Data
Oct. 12, 2017   (GB) .................................. 1716674

(51) Int. Cl.
*A01K 81/04*     (2006.01)
*A01K 79/00*     (2006.01)
(Continued)

(52) U.S. Cl.
CPC .............. *A01K 81/04* (2013.01); *A01K 79/00* (2013.01); *A01K 79/02* (2013.01); *A01K 81/06* (2013.01);
(Continued)

(58) Field of Classification Search
CPC ........ A01K 81/04; A01K 81/06; A01K 81/00; A01K 79/00; A01K 79/02
(Continued)

(56) References Cited

U.S. PATENT DOCUMENTS 3,585,979 A * 6/1971 Hendricks ................. F41B 7/04
                                                    124/35.1
3,638,346 A * 2/1972 Stein ...................... A01K 74/00
                                                    43/17.1
(Continued)

FOREIGN PATENT DOCUMENTS

CN         2547134 Y  *  4/2003
CN         2704218 Y  *  6/2005
(Continued)

*Primary Examiner* — Darren W Ark

(57) ABSTRACT

A submersible (10) and method of using a submersible for capturing a target species comprising: at least one controllable thruster (14) for manoeuvring the submersible; at least one camera (12) for capturing images to allow the identification of an individual of a target species; a catapult mechanism (33) wherein the catapult mechanism is reversibly moveable between a released configuration and a primed configuration by an activatable motor, and wherein the catapult mechanism may be loaded with a retractable device mounted on the catapult mechanism, and the retractable device may be launched from the submersible by being propelled by the catapult mechanism; a container for receiving a captured individual.

14 Claims, 13 Drawing Sheets

(51) Int. Cl.
*A01K 79/02* (2006.01)
*A01K 81/06* (2006.01)
*B63B 35/24* (2006.01)
*B63G 8/00* (2006.01)

(52) U.S. Cl.
CPC .............. *B63B 35/24* (2013.01); *B63G 8/001* (2013.01); *B63G 2008/005* (2013.01)

(58) Field of Classification Search
USPC .................................................... 43/6, 6.5
See application file for complete search history.

(56) References Cited

U.S. PATENT DOCUMENTS

| | | | | |
|---|---|---|---|---|
| 3,754,348 | A * | 8/1973 | Ramsey | A01K 69/08 43/103 |
| 3,820,606 | A * | 6/1974 | Terayama | A62C 31/22 169/25 |
| 5,220,906 | A * | 6/1993 | Choma | F41B 5/12 74/89.37 |
| 7,784,453 | B1 * | 8/2010 | Yehle | F41B 5/1469 124/25 |
| 8,056,493 | B2 * | 11/2011 | Huang | A01K 81/06 124/59 |
| 9,220,246 | B1 * | 12/2015 | Roman | A01K 81/04 |
| 9,255,765 | B2 * | 2/2016 | Nelson | F41B 7/04 |
| 9,341,432 | B1 * | 5/2016 | Wohleb | F41B 5/1469 |
| 9,414,578 | B2 * | 8/2016 | Thornbrough | A01K 81/06 |
| 10,392,085 | B2 * | 8/2019 | Wang | A01K 75/04 |
| 10,458,743 | B1 * | 10/2019 | Kempf | F41B 5/123 |
| 11,122,785 | B2 * | 9/2021 | Greenberg | H04B 11/00 |
| 11,147,251 | B1 * | 10/2021 | Fu | A01K 69/08 |
| 11,156,429 | B1 * | 10/2021 | Kempf | F41B 5/12 |
| 11,268,781 | B1 * | 3/2022 | Kempf | F41B 5/12 |
| 2005/0229439 | A1 * | 10/2005 | Nicholson | B63C 11/52 37/317 |
| 2010/0282158 | A1 * | 11/2010 | Huang | A01K 81/06 124/59 |
| 2011/0315134 | A1 * | 12/2011 | Tsai | F41B 11/643 124/56 |
| 2012/0102811 | A1 * | 5/2012 | Waugh | F41B 13/10 43/6 |
| 2015/0204633 | A1 * | 7/2015 | Nelson | F41B 11/83 124/83 |
| 2016/0084609 | A1 * | 3/2016 | James | F41B 7/04 124/20.1 |
| 2016/0187097 | A1 * | 6/2016 | Jaber | F41B 7/04 124/83 |
| 2016/0278353 | A1 * | 9/2016 | Martin | B63G 8/001 |
| 2017/0360016 | A1 * | 12/2017 | Saue | A01D 44/00 |
| 2019/0061890 | A1 * | 2/2019 | Fiorello | B63G 8/08 |
| 2020/0015464 | A1 * | 1/2020 | Hystad | A01K 73/02 |
| 2020/0260702 | A1 * | 8/2020 | Alburshaid | G03B 17/08 |
| 2021/0219528 | A1 * | 7/2021 | Jin | A01K 79/00 |
| 2021/0307305 | A1 * | 10/2021 | Fu | B64C 37/00 |

FOREIGN PATENT DOCUMENTS

| | | | | |
|---|---|---|---|---|
| CN | 101796941 | A * | 8/2010 | |
| CN | 103057678 | A * | 4/2013 | |
| CN | 104813975 | A * | 8/2015 | |
| CN | 105966577 | A * | 9/2016 | ............ B63B 45/02 |
| CN | 106614432 | A * | 5/2017 | |
| CN | 106891341 | A * | 6/2017 | |
| CN | 109849022 | A * | 6/2019 | |
| CN | 111263583 | A * | 6/2020 | ............ A01K 79/00 |
| EP | 3033936 | A1 * | 6/2016 | ............ A01D 44/00 |
| ES | 2528566 | A1 * | 2/2015 | ............ A01K 79/00 |
| FR | 2778529 | A1 * | 11/1999 | ............ A01K 81/06 |
| FR | 2960957 | A1 | 12/2011 | |
| GB | 1204640 | A * | 9/1970 | |
| GB | 1204640 | A | 9/1970 | |
| GB | 2536682 | A | 9/2016 | |
| GB | 2536682 | A * | 9/2016 | ............ A01K 79/02 |
| GB | 2571003 | A * | 8/2019 | ............ A01K 79/00 |
| JP | S5167293 | U | 5/1976 | |
| JP | 2011205978 | A * | 10/2011 | |
| JP | 6636519 | B2 * | 1/2020 | ............ A01D 44/00 |
| JP | 2021503906 | A | 2/2021 | |
| KR | 100332616 | B1 * | 4/2002 | |
| KR | 100401329 | B1 * | 10/2003 | |
| KR | 20090012345 | U * | 12/2009 | |
| KR | 200449749 | Y1 * | 8/2010 | |
| KR | 101019809 | B1 * | 3/2011 | |
| KR | 102144792 | B1 * | 8/2020 | |
| WO | WO-2016122167 | A1 * | 8/2016 | ............ A01K 81/00 |
| WO | WO-2017042785 | A1 * | 3/2017 | |
| WO | WO-2017216512 | A1 * | 12/2017 | ............ A01K 79/00 |
| WO | WO-2019083375 | A1 * | 5/2019 | ............ A01K 79/00 |
| WO | WO-2019135070 | A1 * | 7/2019 | ............ A01K 79/00 |

* cited by examiner

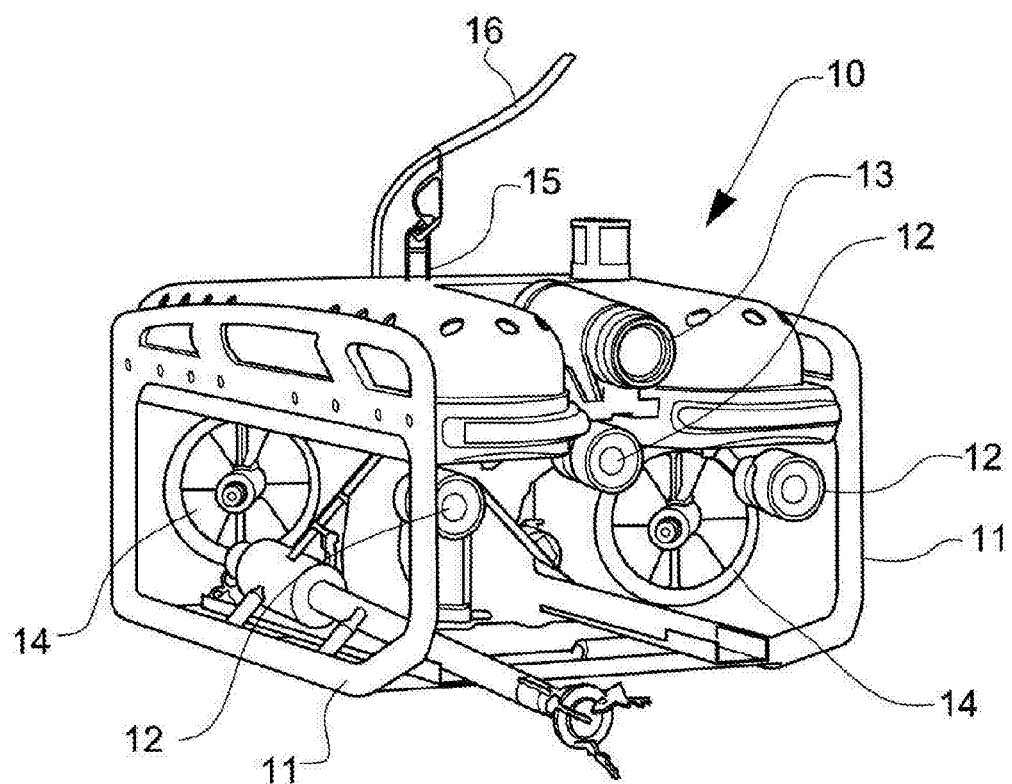
FIG 1
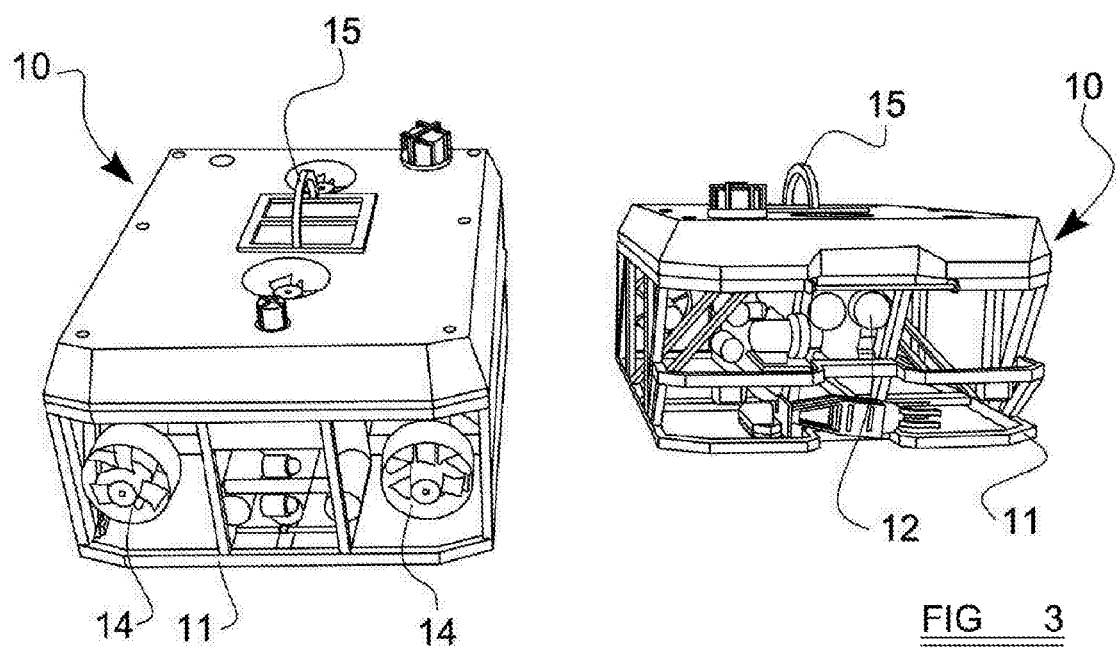
FIG 2
FIG 3

METHOD APPARATUS AND SYSTEM FOR CONTROLLING FISH

DESCRIPTION OF INVENTION

The invention relates to a method and apparatus for controlling fish and in particular, a method of capturing invasive species of fish, such as lionfish, with virtually no by-catch.

Invasive species of fish are proving to be devastating to the local environment and impact on the local economy. For example, in the west Atlantic, lionfish have been introduced from their native region of the Indian and Pacific oceans around the Philippians. In the west Atlantic, the species has no natural predators and is thriving in the new habitat.

In recent times, lionfish are reported as a problem in Bermuda, the Caribbean, USA and parts of the Gulf of Mexico and South America, and the population spread and population density continue to grow rapidly. Lionfish populations may be found in large numbers at depth as well as in shallower waters and they are happy in a range of habitats such as coral reefs, artificial reefs, mangroves and sea grass beds. The fish are having a big impact on the native species and coral reef, on which they feed.

The lionfish are also impacting on commercial interests and represent a risk to health, as the lionfish have venomous spines. This affects recreational and commercial fishing, the tourist industry, divers, snorkelers, and swimmers. Lionfish are also having an impact around oil rigs.

Accordingly, there is a need to mitigate the negative impacts of the lionfish by continuous management of their population, by monitoring and removal of the fish. Management of their population is difficult because of the risk from their venomous spines.

Traditional spear fishing techniques are used but the small numbers of fish that are killed and the level of safety equipment required means that such methods are inadequate to effectively manage the population growth. Other diving techniques include use of a syringe-type slurp-gun to trap and bag fish, typically for collecting tropical fish species. Lobster trappers report that lionfish are often caught in small numbers in lobster traps but this is incidental and is not enough to control their population in the diverse habitats that they populate. There are not currently commercial viable fishing techniques.

GB2536682 and US-2016-0278353-A1 are directed to a method and apparatus for controlling fish. These present the first attempt to automate fishing for specific invasive species of fish using two ROVs (remotely operated vehicle) working together from a surface vessel. UK application GB1610520.7 and international application PCT/GB2017/051163 are directed to methods and apparatuses for controlling fish, also. This document discloses fishing for a specific invasive species using one ROV.

There is a need to develop technology to efficiently manage the fish population using trapping, deep water culling, and shallow water culling solutions while minimising the risk to health and by-catch.

The present invention aims to provide a more efficient system of automated fishing which requires fewer people needed to handle equipment and aims to be cheaper and more efficient. Using smaller and more efficient machines and or with additional specific tools may provide an improved system.

SUMMARY OF THE INVENTION

Aspects of the invention are set out in the accompanying claims.

A submersible and method of using a submersible for capturing a target species comprising: at least one controllable thruster for manoeuvring the submersible; at least one camera for capturing images to allow the identification of an individual of a target species; a catapult mechanism wherein the catapult mechanism is reversibly moveable between a released configuration and a primed configuration by an activatable motor, and wherein the catapult mechanism may be loaded with a retractable device mounted on the catapult mechanism, and the retractable device may be launched from the submersible by being propelled by the catapult mechanism; a container for receiving a captured individual.

The method comprises the steps of: manoeuvring a submersible to position a primed catapult mechanism mounted on the submersible to be substantially aligned with the body of an individual of a target species, wherein the catapult mechanism is loaded with a retractable device; releasing the primed catapult mechanism and retractable device, to attempt capture the individual of the target species; drawing back the catapult mechanism and retractable device, wherein if the capture attempt is successful the retractable device carries the captured individual of the target species to the submersible and the captured individual is dislodged and contained within the submersible.

A catapult mechanism reversibly moveable between a primed configuration and a released configuration and for loading a retractable device, comprising: a rack for holding a releasable retractable device comprising a rack, clutch, and trigger hook; an elastic member for propelling the releasable retractable device; a pinion gear set, wherein the pinion gear set comprises at least a drive gear and a pinion gear, wherein the pinion gear set is driven through the drive gear by a drive motor; wherein, when driven starting from the released configuration, the pinion gear engages with the rack to draw back the retractable device and as the rack transitions from the released configuration to the primed configuration the elastic member is stretched and stores potential energy, as the mechanism approaches the primed configuration a trigger mechanism engages with a release mechanism, to cock the catapult mechanism a clutch interacts with the pinion gear set to disengage the pinion gear from the rack and the mechanism is ready to fire; and the rack may be released from the primed configuration to the released configuration by disengaging the trigger mechanism and the release mechanism, whereby the elastic member acts to propel the retractable device.

Once the submersible is in the water, and an operator has manoeuvred the submersible into position, in-line with a target species of fish, using a controller, the operator releases the catapult and the retractable device (typically a spear or grab tool) is propelled towards the fish to capture the fish. The retractable device is then pulled back into the tube. A pair of electrodes located within the tub are activated to stun or kill the fish. As the retractable device is pulled back further into the tube the fish is dislodged. By stunning or killing the fish with the electrodes, the fish is less likely to be able to swim away after it has been captured and dislodged from the spear. The operator then activates an impeller which creates enough suction to pull the fish into the collection cage located on the bottom of the submersible. Afterwards, the catapult may be reset ready to capture more fish. The spear may be a readily available typical dive fishing spear.

The catapult mechanism may be released and by activating a trigger. Movement of the catapult mechanism may be enabled by the motor and controlled by a passive system including a clutch and gear arrangement. The rack may comprise a chain, which is readily available.

Thus, the method captures fish with minimum damage to the fish so that subsequently the fish may be sold as food or for other purposes.

A captured fish may be carried back into the submersible when the retractable device is drawn back, within a tube. The tube mouth may be angled downward, and the tube may bend through an angle. When the retractable device is drawn back, the fish is pushed off the spear by the side of the tube.

In some instances the fish may not be killed. To ensure that the captured fish do not escape, a flap located in the conduit may act as a one-way valve so that once in the container the fish cannot swim out.

The flap may move in response to the impeller (thruster) action. When the impeller is activated, the flap opens due to a pressure change to allow the fish to move through the tube. When the impeller stops or is deactivated the flap closes and the fish is trapped in the container i.e. the flap assists with containing the fish and prevents the captured fish from escaping.

An operator controls the submersible via a tether or any other suitable means. In some instances it may be possible to control the submersible 'wirelessly', in particular when batteries are carried on the submersible. The cameral and illumination lights are used by the controlled to decide how to manoeuvre the submersible and when to release the retractable device. Such a decision may be assisted by using movable lasers. Further, the lasers may be used to isolate an individual fish of a target species, as fish tend to follow the light, and so non-target fish may be drawn away.

A surface vessel may assist the operation. According to the method two or more submersibles may be deployed from a surface vessel. Optionally four submersibles may be deployed from a single surface vessel. Each submersible may be operated from the surface vessel to clear a harvest area.

Further one or more scout boats may be used to locate an area containing a target species.

When one or more individuals are captured in the container the submersible may be returned to the surface vessel. A sensor may be used to indicate that the container is full, and therefore when there is a need for the submersible to return to the surface vessel.

Once the submersible has returned to the surface vessel, the submersible may be lifted or hoisted to the deck of a surface vessel and the container removed.

Then the removed container may be replaced with an empty container and redeploying the submersible. Thus, the method works efficiently to clear an area of a target species.

Meanwhile, any captured individual(s) may be prepared for packaging and shipping.

Thus, the method may be used for collecting and processing captured fish to be later sold. The method is both efficient and cost effective and may cause minimal damage to the fish. Furthermore, the method minimises the impact on the environment while targeting particular species of fish.

Thus, a modified submersible is provided suitable for carrying out the method. Typically the submersible is a Remotely Operated Vehicle (ROV) or underwater drone. Typically the retractable device is a spear or a grab tool.

The container may be a mesh bag or a cage. The container may hold up to 50 kg or less of the target species. In some arrangements the container may hold more than 50 kg of the target species. Thus, the container may contain many individuals of the target species. Therefore, the ROV will only have to return to the surface vessel periodically, when the container is full or when an area has been cleared.

Overall, a system for controlling a target species is provided. The system comprises: an ROV; and deploying the ROV in a target area for capturing individuals of the target species.

Further the system may comprise a surface vessel, wherein the submersible may be connected to the surface vessel by a tether, and the submersible may be powered and or controlled via the tether. The submersible may be controlled by an operator to manoeuvre the submersible.

In the system, two or more submersibles may be deployed from the surface vessel. Optionally up to four submersibles may be deployed from a single surface vessel. Further comprising one or more scout boats may be employed to locate a harvest area. At least one deck-hand may assist in the use of the apparatus.

The method, apparatus and system have the advantage of the ability to target lionfish, or other species of fish, in deep crevices in reefs or on ocean floor. It is also possible to fish close to structures which may otherwise inhibit an ROV from getting close enough to capture the fish. The method, apparatus and system is effective from shallow water docks to oil rigs.

Thus, a method, submersible and system are provided to address the problems with the known art in the pursuit of controlling a marine target species.

BRIEF DESCRIPTION OF THE DRAWINGS

Further advantages of the invention may become apparent to those skilled in the art with the benefit of the following detailed description of the preferred embodiments and upon reference to the accompanying drawings in which:

FIGS. 1 to 3 illustrate a known ROV.

DESCRIPTION OF THE INVENTION

Figure 4:
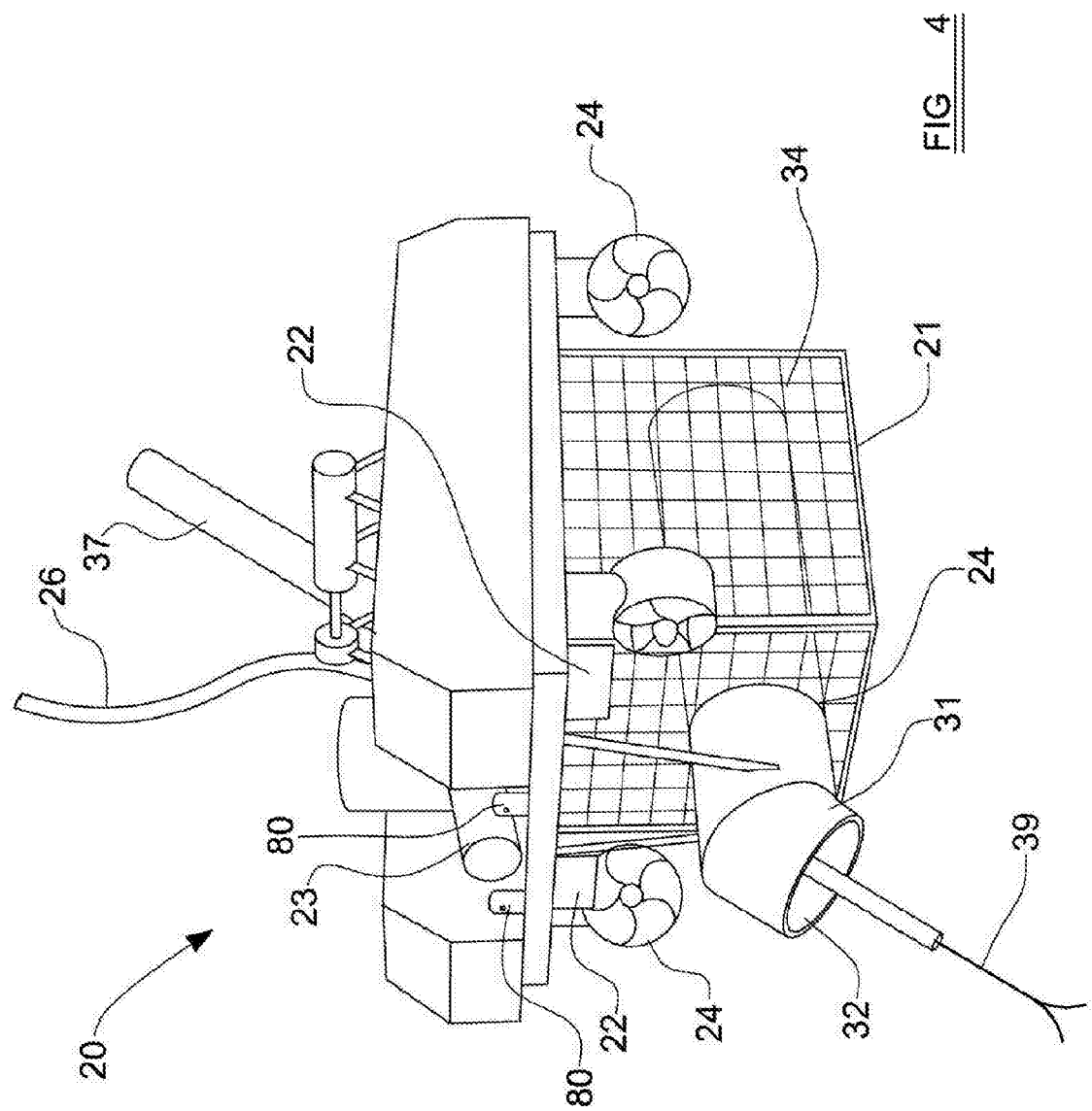
FIG. 4 illustrates a modified ROV.

Referring to the drawings, like reference numerals designate identical or corresponding features throughout the views:

In overview, the invention relates to a method of catching and killing an individual of a target species using a submersible. A submersible may be a Remotely Operated Underwater Vehicle (ROV), a submersible robot or underwater drone, a manned submersible, a hand-held scuba-scooter, a ride-on scuba-scooter, a sea-glider and other types of diver propulsion vehicles that are capable of being modified for the purpose of the invention. There are many types of submersibles available today, including stationary marine submersibles. ROVs are particularly useful. There are many types of ROVs available today. According to the invention, one submersible is used. The submersible used described herein can be readily modified from basic models in order to carry out the specific tasks required in the environment in which it operates. Although the description is with reference to an ROV the skilled reader will understand that the ROV could be substituted for any suitable marine submersible.

FIGS. 1 to 3 illustrate known ROVs 10 suitable for modification for carrying out a method of collecting a target species. The ROV is a relatively light and manoeuvrable model of ROV that is able to accelerate and turn quickly.

The ROV 10 has a frame 11 which surrounds the other components of the ROV 10. Lights 12 and a camera 13 are mounted on the front of the ROV 10. One or more thrusters 14 are mounted at the back or sides of the frame 11, and the one or more thrusters 14 are used to manoeuvre the ROV 10. On the upper surface of the ROV 10, a handle 15 is located. The handle 15 is used to secure a tether 16 and may also be used for attaching a hoist for deploying the ROV.

FIG. 4 illustrates a modified ROV 20 suitable for operation between depths of 0 m to 1500 m and is a machine that is agile and able to be manoeuvred to find a targeted species. Similarly to the known ROV 10, the modified ROV 20 has a frame 21 which surrounds some or all of the other components of the ROV 20. Illumination lights 22 and a camera 23 are mounted on the front of the ROV 20. One or more thrusters 24 are mounted at the back or sides of the frame 21 and the one or more thrusters 24 are used to manoeuvre the ROV 20. For example, the ROV 20 may have seven or more thrusters 24 located around the periphery of the ROV 20 to ensure controllability in 3 dimensions underwater. On the upper surface of the ROV 20, a handle 25 (not shown) is located. The handle 25 is used to secure a tether 26 and may also be used for attaching a hoist for deploying and/or retrieving the ROV 20.

The lights 22 and camera 23 may be used together by an operator in order to quickly and effectively locate an individual fish of a target species in a designated area. The camera 23 captures images which allow an operator to identify the target species and to manoeuvre the ROV 20 within the environment. The locating equipment (which may include other imaging equipment and lights—not shown) is suitable for use over the full depth range (typically up to 1500 m) and in a diverse range of habitats. The ROV 20 is typically a small machine that is capable of moving relatively quickly around reef habitats and other habitats which are likely to be identified as harvest areas for the targeted fish.

The thrusters 24 are mounted towards the back and on the sides of the ROV 20 and may be controlled by an operator for manoeuvring the ROV 20. Additional cameras may be mounted at other locations on the ROV to provide a wider field of view.

Control signals and or power for operating the ROV 20 are preferably received by the ROV 20 via the tether 26 cable. A detailed illustration of the tether is provided in FIG. 5. Other components of the ROV 20, such as an arm (not shown) may be mounted on the ROV 20. Typically an arm may be used for relocating and untangling the tether 26 if it becomes tangled around the ROV 20, such components will be known to those skilled in the art. Power is preferably supplied to the ROV 20 via the tether 26 connected to a surface vessel. The frame 21 surrounds the majority of the components of the ROV 20 so that they do not become damaged during use, and to provide strength and stability to the structure.

ROV 20 is modified to comprise a catapult mechanism 37. The catapult mechanism 37 is moveable between a released configuration and a primed configuration (as shown in FIG. 4). The catapult mechanism 37 is loaded with a retractable device 39 such as a spear. The spear may have barbs to ensure that a captured fish is retained on the spear until it is dislodged when desired. More details of the catapult mechanism 37 will be described below.

Figure 5:
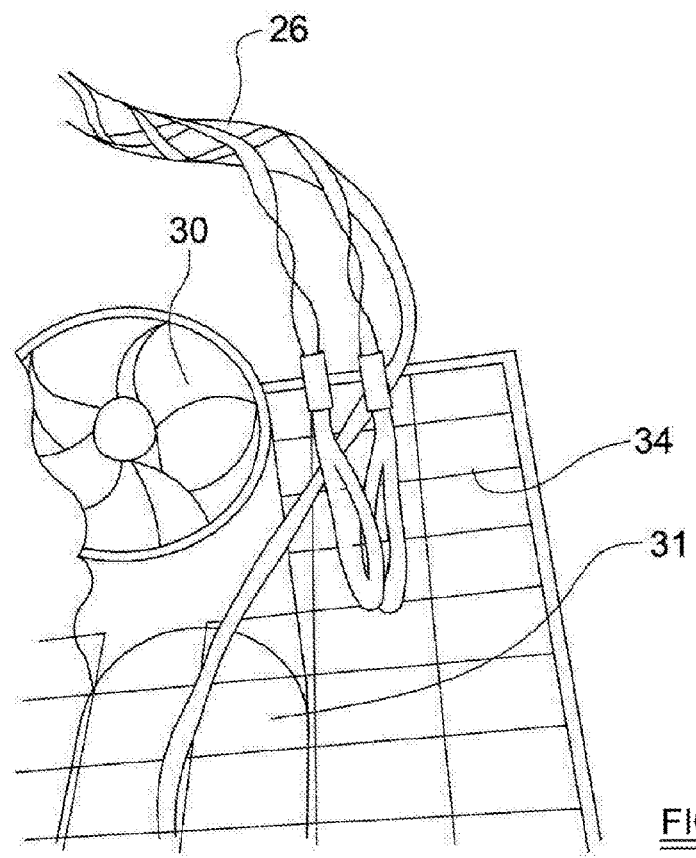
FIG. 5 illustrates a partial top view of the modified ROV.

The ROV 20 is further modified from a standard ROV 10 to include a tube 31 and impeller 30. Located within the tube may be a pair of electrodes (not shown). FIG. 5 illustrates a partial top view of the ROV 20. The impeller 30 may be seen in FIG. 5. The impeller 30 may be an additional auxiliary thruster mounted on the top of the ROV 20.

In the illustration the tube 31 has a funnel shaped mouth 32 opening at the front end to direct targeted fish into the main body of the tube 31. The pair of electrodes are located on opposite sides within the tube mouth 32 or further inside the tube. The electrodes may be activated to deliver a high tensile voltage to the captured individual as the catapult mechanism is re-primed to stun or kill a captured individual of the target species. Typically the electrodes are made from stainless steel 316 to that they are suitable for use in salt water conditions and are electrically insulated from the other components of the ROV. The voltage may be 8V-15V and preferably around 12V. The impeller 30 is directed in a downward direction, relative to the ROV 20, and is in fluid communication with the interior of the tube 31 to provide a pressure potential when it is activated (i.e. to reduce the pressure in the tube and create a fluid liquid flow when the ROV 20 is submersed). The tube 31 is preferably mounted on the bottom of the ROV 20. Surrounding many features of the ROV 20 is a cage 34. Typically, the basic ROV sits above the cage 34 and the thrusters 24 are located outside the cage 34. Towards the front of the ROV 20 the tube mouth 32 and partially the tube 31 protrude from the front of the cage.

Between the tube opening 32 and the cage 34 there may be a one-way flap valve (not shown) which in a closed position retains captured fish in the releasable container or cage 34. The flap-valve may be biased in a closed position. When the impeller 30 a fluid flow is created in the tube 31, in the direction of the tube mouth 32 to the distal end of the tube due to pressure potential. This moves the flap-valve to the open position allowing water and any captured fish to move along the tube 31 to the cage 34. The tube 31 may have a diameter of approximately 20 cm. The tube 31 is of suitable size to allow the targeted fish to easily pass through the tube body from the opening to the cage 34. Of course, other arrangements of the tube 31 relative to the ROV 20 are anticipated by the inventor and will be discussed in more detail below. For example, the tube 31 may be positioned on one side of the ROV 20 with the impeller 30 mounted on the side of the ROV 20 also.

Figure 6:
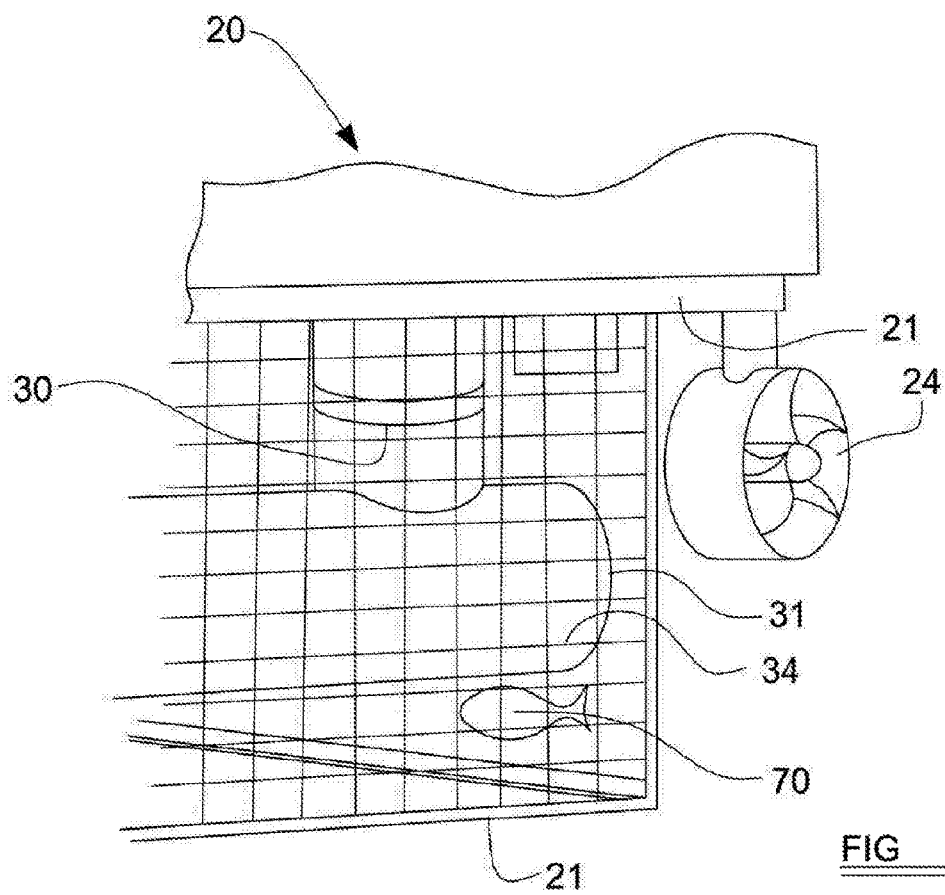
FIG. 6 illustrates the lower rear end of the ROV.

FIG. 6 illustrates the lower rear end of the ROV 20. Mounted on the back corner of the frame 21 is a thruster 24. The frame 21 extends from the main body of the ROV 20 to below the tube 31. The impeller 30 is located between the main body of the ROV 20 and the tube 31 and is in fluid communication with the tube 31. The cage 34 is attached to the frame 21 and surrounds the components of the modified ROV 20. Trapped within the cage 34 is a fish 70.

Figure 7:
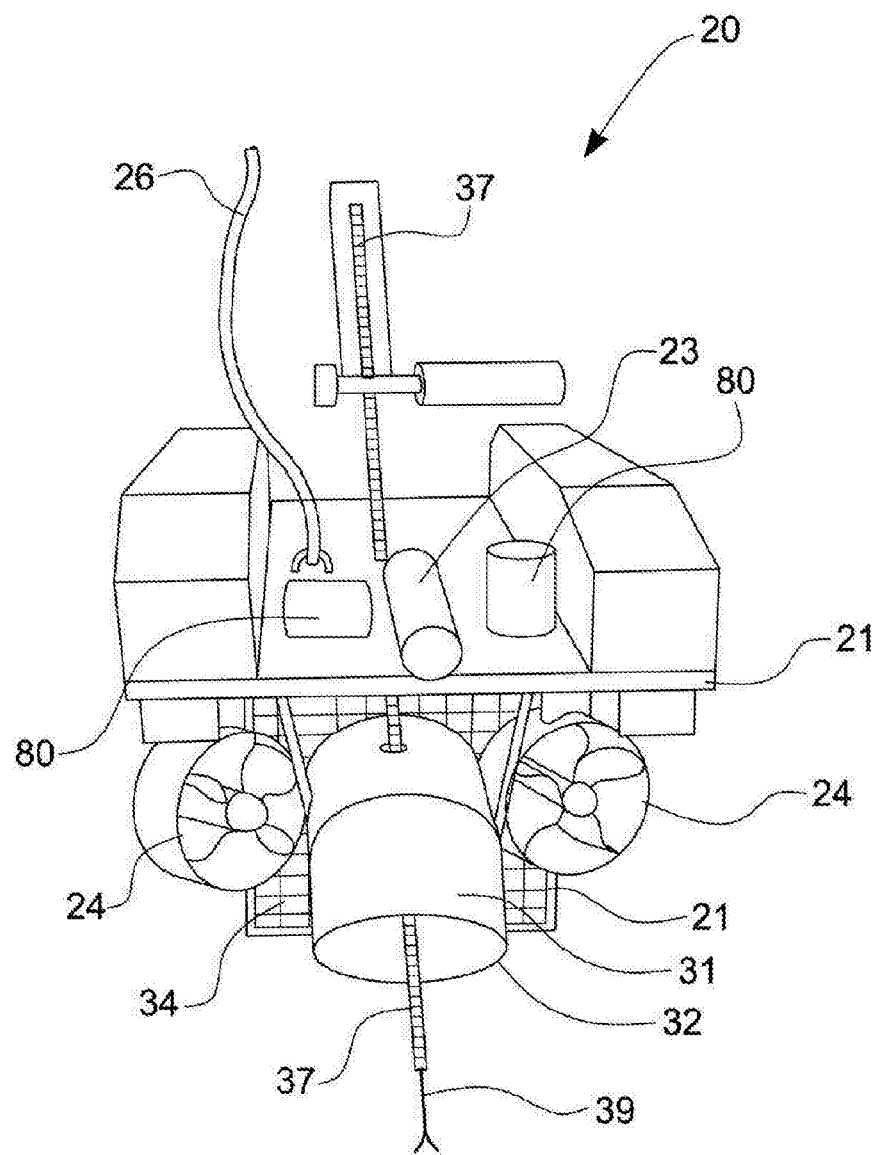
FIG. 7 illustrates a front view of the ROV.

FIG. 7 illustrates a front view of the ROV. At the tube mouth 32 the tube 31 is angled in a downward direction, relative to the main body of the ROV 20. In traditional spear fishing it has been found that directing a spear in a downward direction gives the best chance of success in spearing and capturing a fish. Similarly, the modified ROV 20 typically as the best success rate of capturing fish when the tube 31 is angled downward, preferably at 45° or around 45° (e.g. between 30° and 60°, or between 40° and 50°) from horizontal. In order to accommodate this arrangement, the tube 31 bends at an elbow through approximately 45° under the main body of the ROV 20 so that the distal end of the tube 31 is parallel with the underside of the ROV 20.

At the mouth 32 and the mouth end of the tube 31, the catapult mechanism 37 is located along the central axis of the tube 31. The catapult mechanism is substantially straight along its length and protrudes from the top of the ROV 20. Therefore, the catapult mechanism 37 passes through a relatively small opening in the side of the tube 31 proximate to the elbow bend of the tube 31 in order to allow the catapult mechanism 37 to extend above the body of the ROV 20.

In use, when the catapult mechanism 37 is retracted or re-primed from the released position, if a fish is captured on the spear 39, the electrodes are activated and the fish is stunned or kill. Then, where the catapult mechanism 37 passes through the side of the tube 31, the side of the tube 31 dislodges the fish from the spear 39 when the fish is within the tube 31.

Typically, the tube will be made from a plastic or metal material that is suitable for use in salt water conditions. For example drain pipe tubing may be used, which has the advantage of being readily available.

In addition to the illumination lights 22, the ROV 20 may be modified to include two or more lasers 80. The lasers 80 are located on the top surface of the ROV 20, either side of the camera 23. The lasers 80 are independently controllable by an operator to rotate their direction. The lasers may be of different colours, for instance one laser 80 may be green, and the other laser 80 may be red. The operator may use the lasers 80 to ensure that the ROV 20 is correctly positioned to capture a fish when the catapult mechanism 37 is released and the spear 39 is propelled from the ROV 20. For example, when the lasers 80 are crossed at the location of a fish (as determined by the camera 23 images), the operator may expect the spear 39 to capture the fish.

The catapult mechanism 37 is now described in more detail in connection with FIGS. 8 to 13.

Figure 8:
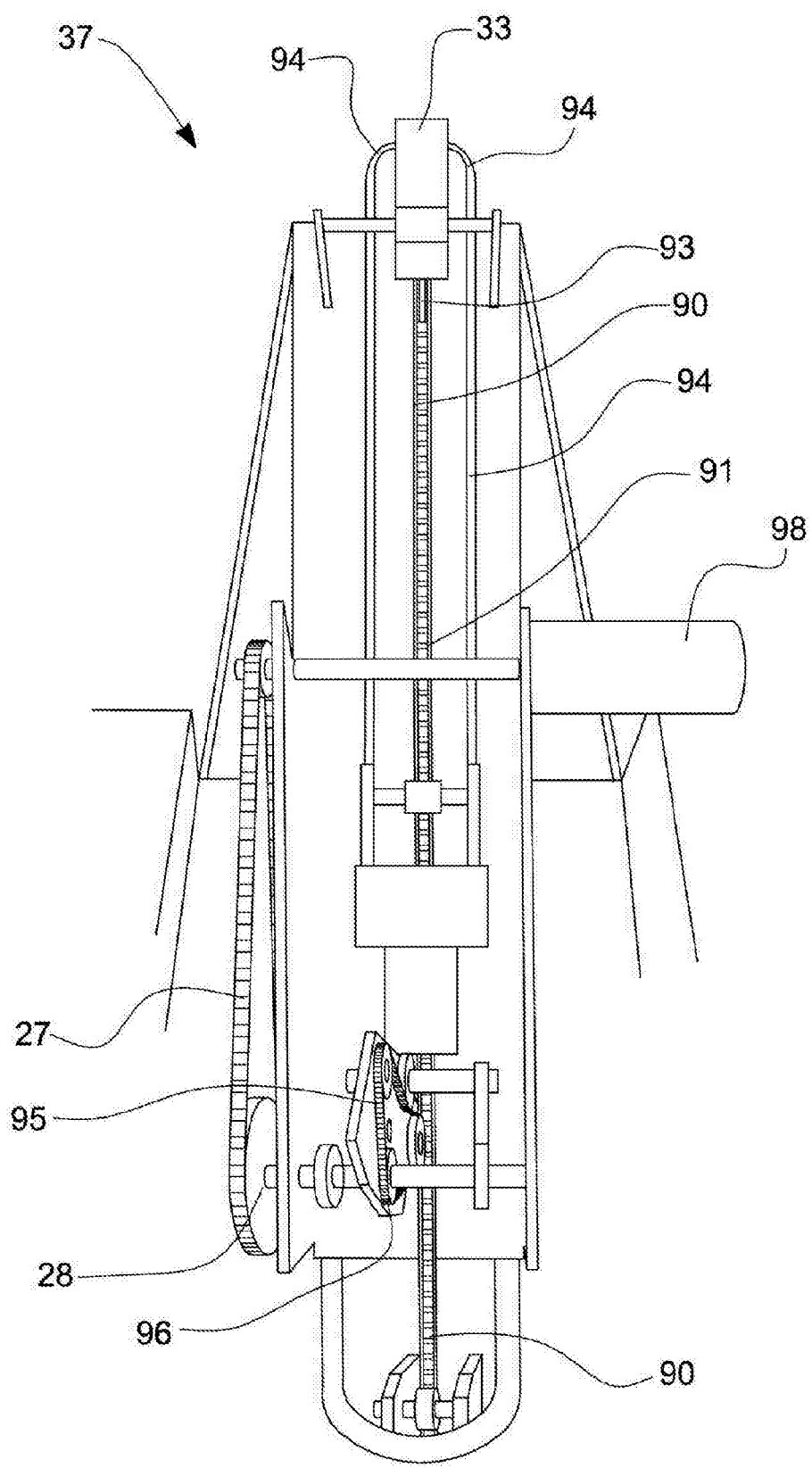
FIG. 8 illustrates the catapult mechanism mounted on an ROV and viewed from above.
Figure 9:
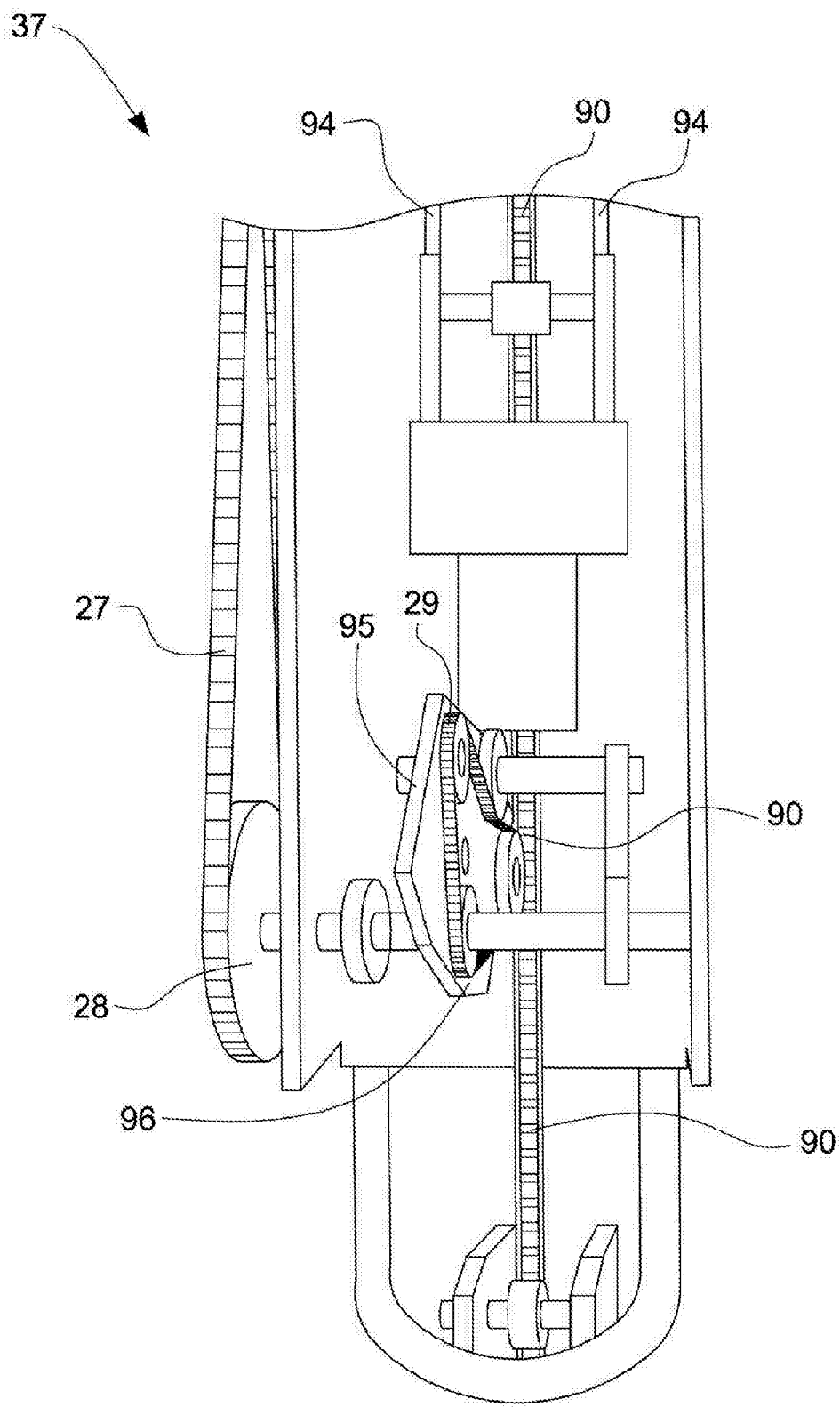
FIG. 9 illustrates a detail of the catapult mechanism mounted on an RO and viewed from above.
Figure 10:
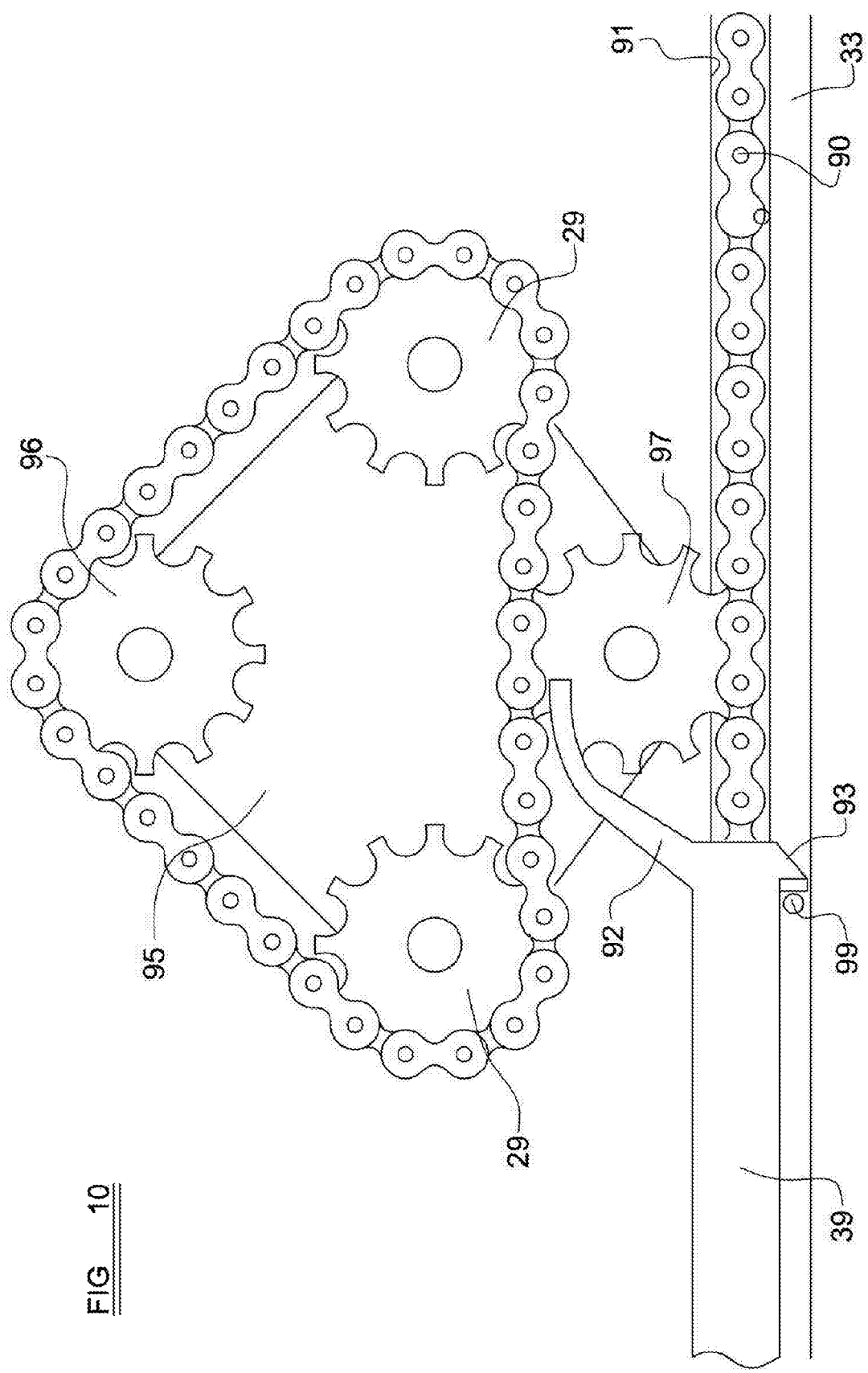
FIG. 10 is a diagrammatic side view of a rack and pinion mechanism.
Figure 11:
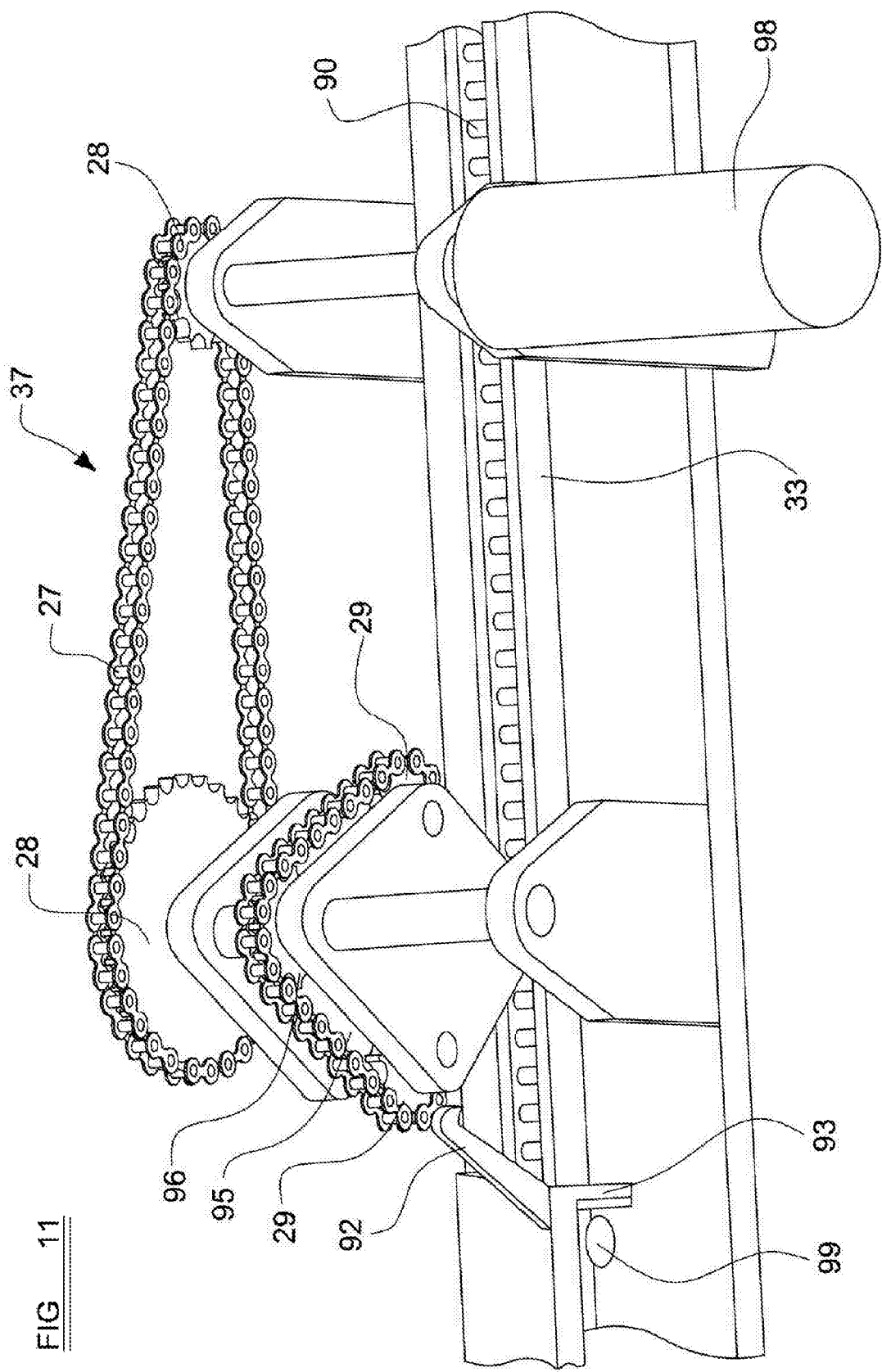
FIG. 11 is a diagrammatic perspective view of the drive, rack and pinion mechanism.
Figure 12:
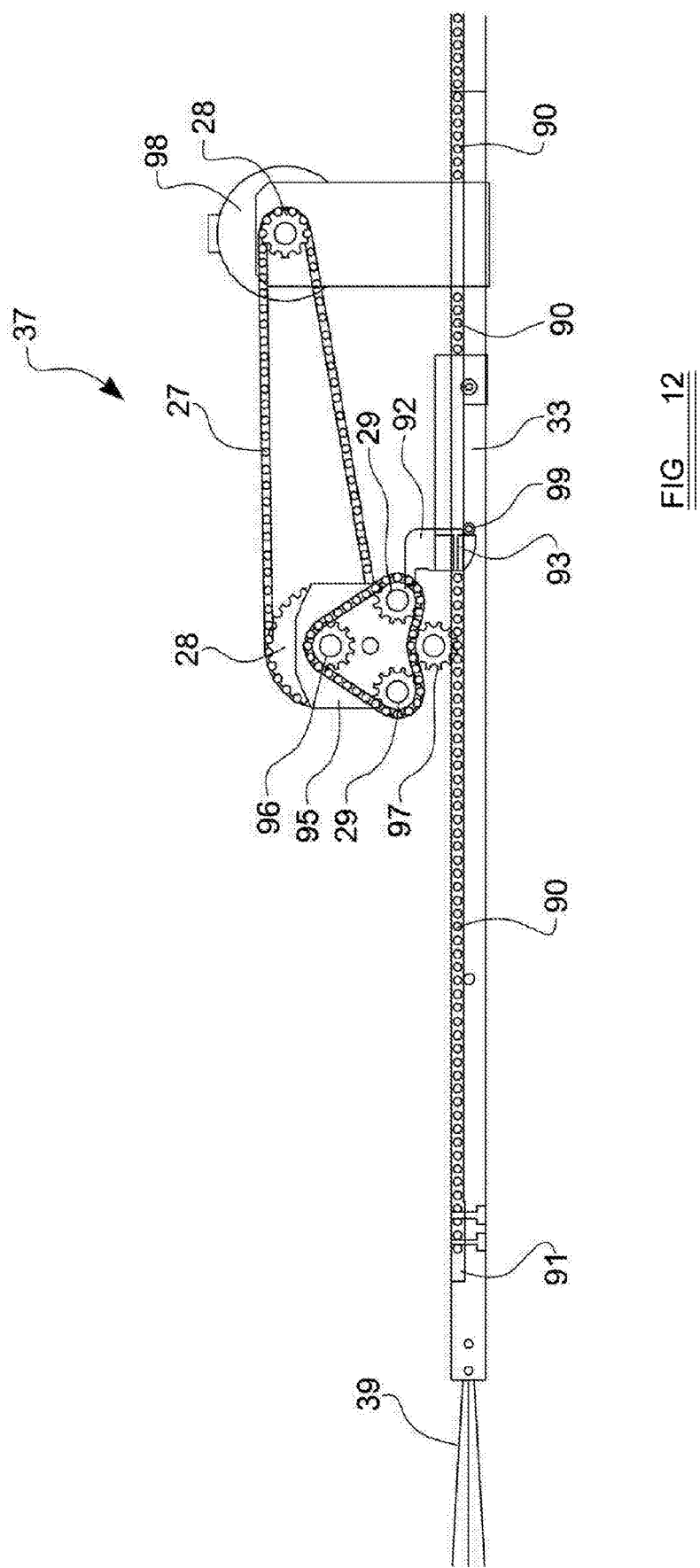
FIG. 12 is a diagrammatic side view of the catapult mechanism.
Figure 13:
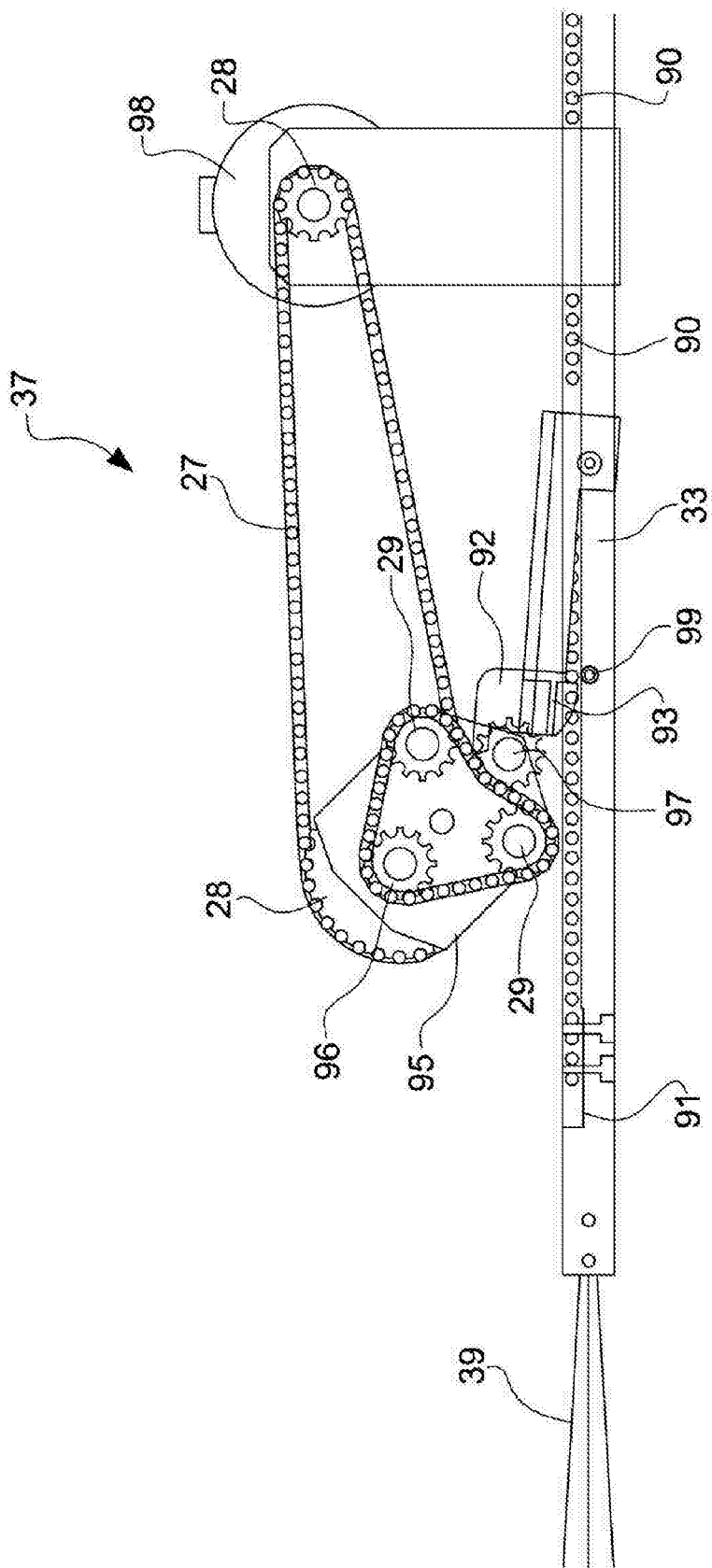
FIG. 13 is a diagrammatic side view of the catapult mechanism.

FIG. 8 illustrates the catapult mechanism 37 mounted on an ROV 20 and viewed from above. FIG. 9 illustrates a detail of the catapult mechanism 37 mounted on an ROV 20 and viewed from above. FIG. 10 is a diagrammatic side view of a rack and pinion mechanism. FIG. 11 is a diagrammatic perspective view of the drive, rack and pinion mechanism. FIG. 12 is a diagrammatic side view of the catapult mechanism 37. FIG. 13 is a diagrammatic side view of the catapult mechanism 37.

As noted above, the catapult mechanism 37 is movable between a primed configuration and a released configuration and may be loaded with a retractable device, such as a spear 39. The spear 39 may be, or may have a similar form to, a traditional fishing spear modified for use in the housing of the catapult mechanism 37. Such spears are readily available and may have a multi-pronged barbed spear head. The spear 39 may be approximately 2 m long. The spear 39 may be made from Delrin plastic or fiberglass, and may have a 2 cm square cross section.

The spear 39 fits into a rack housing 33, and the tail end of the spear 39 is attached to the rack 90. The rack 90 may comprise a length of chain, although this is not essential and in other embodiments the rack may take the form of a single elongate element with a series of teeth formed thereon. The chain rack 90 may be approximately 1.5 m long and is contained within the rack housing 33. The rack housing 33 helps to keep the spear 39 in the correct position and straight.

A pinion gear set 95 comprises at least a drive gear 96 and a pinion gear 97, and the pinion gear 97 engages with the chain rack 90 to move the chain rack 90 according to a rack-and-pinion gear arrangement. The pinion gear 97 is driven by the drive gear 96. The pinion gear 97 may be directly driven by drive gear 96, or, as shown in the embodiment illustrated, a chain, tensioned by first and second idler gears 29 is configured around the outside of the drive gear 96 and the first and second idler gears 29 and engages with the 'inside' of the pinion gear 97. In such an arrangement, the gear set 95 may have a generally diamond shape with the drive gear 96 and pinion gear 97 located at opposite corners, and the idler gears 29 located at the corners between the drive gear 96 and pinion gear 97. Thus, the pinion gear 97 turns in the opposite direction compared with the drive gear 96 and the 'outside' of the pinion gear 97 engages with the rack 90.

Please amend the paragraph beginning at line 12 on page 15 as follows: The drive gear 96 is driven by a motor 98. The motor 98 may act directly on the drive gear 96 with a shared axle, or, as shown in the embodiment illustrated, a drive chain 27 links drive sprockets 28. The secondary drive sprocket 28 shares an axle with the drive gear 96. The motor 98 may be a direct current (DC) brushed geared motor.

When the motor 98 is driven in a first direction and the pinion gear 97 is engaged with the rack 90, the rack 90 and spear 39 move towards the primed position. An elastic member 94 is fixed to the ROV either side of the housing 33, and to the end of the spear. Accordingly, as the catapult mechanism 39 moves from a released position to a primed position, the elastic member 94 is stretched, thereby storing potential energy. The elastic member 94 may comprise a single "surgical rubber" tube band to fit the set-up of the mechanism, typically around 0.9 m total length.

When the rack 90 reaches the primed position, a trigger mechanism 93 engages with a release mechanism 99. Typically the trigger mechanism 93 takes the form of a trigger hook 93 associated with the rack 90 and the release mechanism 99 takes the form of two pins 99 located each side of the spear 39/rack 90 arrangement. A Hall-effect switch may be positioned to switch off the motor 98 when the catapult mechanism 39 reaches the primed position.

The trigger hook 93 engages with the two pins 99, and the housing 33 and spear 39 are then locked in place, with the elastic member 94 in its stretched configuration. In this primed position the catapult is cocked, ready to fire. The motor 98 is re-started in a reverse direction. This causes a clutch 92 to interact with the pinion gear set 95, causing the pinion gear set 95 to rotate about the drive axle and disengage the pinion gear 97 and rack 90 from each other. The pins 99 hold the spear 39 ready to fire.

When the operator uses a control to fire the spear 39, the motor engages with the gear set 95, which slightly lifts the spear 39 thereby the trigger hook 93 is released from the pins 99, the spear 39 is propelled by the potential energy stored in the elastic member 94. The spear 39 extends from the mouth 32 of the tube 31 with the aim of capturing a fish. The chain rack 90 remains attached to the spear 39 and within the housing 33 and is uninhibited to follow the spear 39 as it is propelled. The housing 33 assists in directing the spear 39 to keep the spear 39 on target without veering to one side.

In order to retain the mechanism 37, stop buffers are positioned at a suitable location towards the mouth end of the housing 33. As the spear 39 and rack 90 are propelled, the clutch disengages with the pinion gear set 95. The spear 39 and rack 90 may then be drawn back into the housing 33 by reactivating the motor 98 in the first direction, and eventually the spear 39 and rack 90 engage with the trigger mechanism to hold the spear in primed or firing position.

The motor 98 is controlled and powered via the tether 26. The release mechanism 99 is also controlled via the tether 26.

To carry out a method of collecting and catching a target species using the system disclosed herein, one or more ROVs 20 are taken, in a surface vessel, to a fishing site and deployed to work under water. The ROVs 20 are used to harvest the target species from the fishing site. The ROVs 20 are operated from the surface vessel (or another location, for example from a shore/land location). Each of the ROVs 20 may operate using an independent operating system. The ROVs 20 are independently manoeuvrable relative to each other and to the surface vessel, however, they are preferably each attached to the surface vessel with a tether 26. Typically the tethers 26 will have a length of approximately 1200 m, corresponding to their depth range, to allow for a suitable range of movement by the ROV 20 according to their depth range. The surface vessel may have additional equipment for assisting and identifying the location of the target species.

In order to find a harvesting location for the target species, the surface vessel may be in communication with a number of scout boats which take images of the ocean floor. This information is relayed to the operator on board the surface vessel to identify areas that contain the targeted species.

In addition, the ROV(s) may have be fitted with locating equipment, such as sonar. This may help locate underwater structures, to which it is known the fish are attracted.

Figure 14:
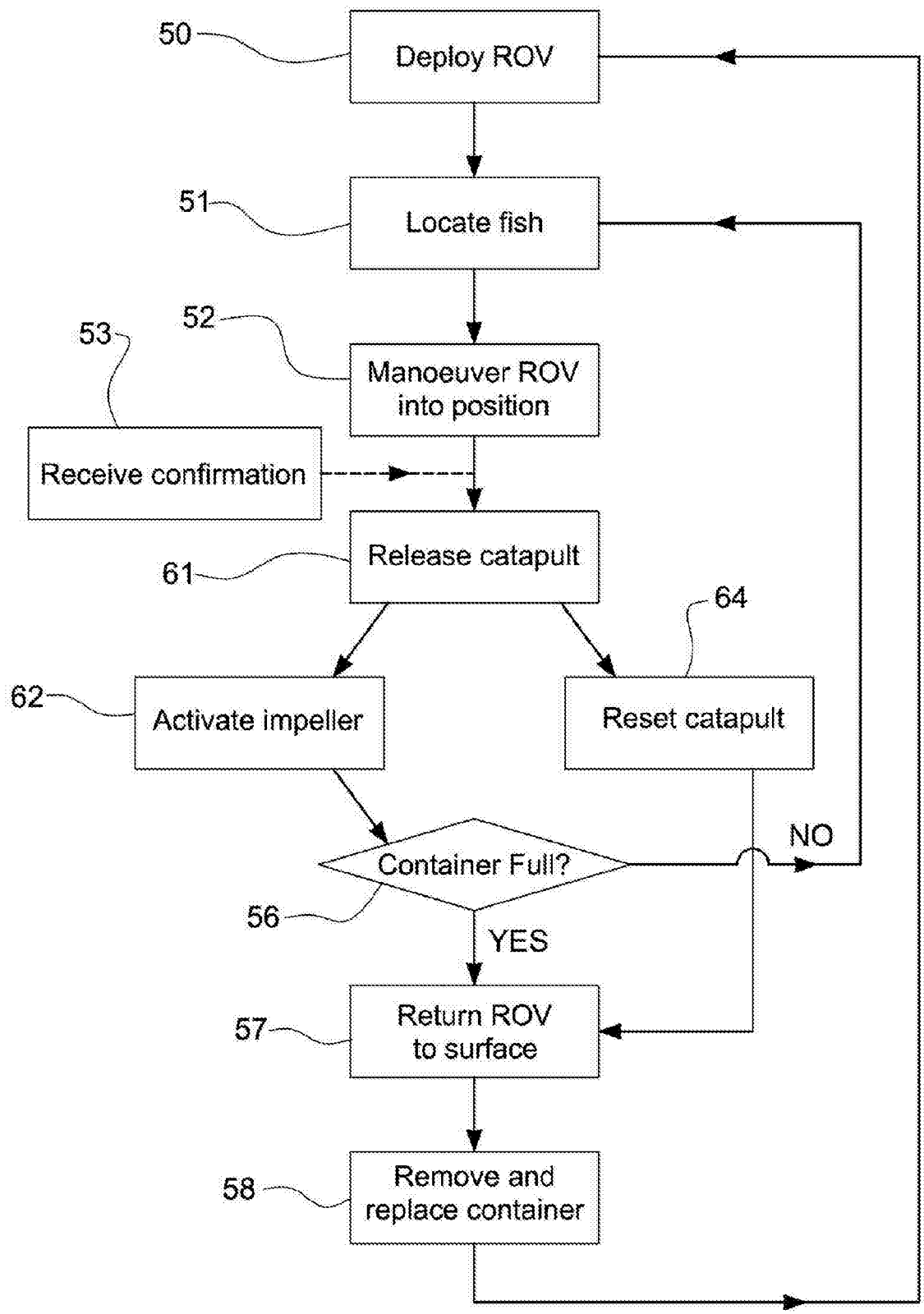
FIGS. 14 to 18 illustrate a method.
Figure 15:
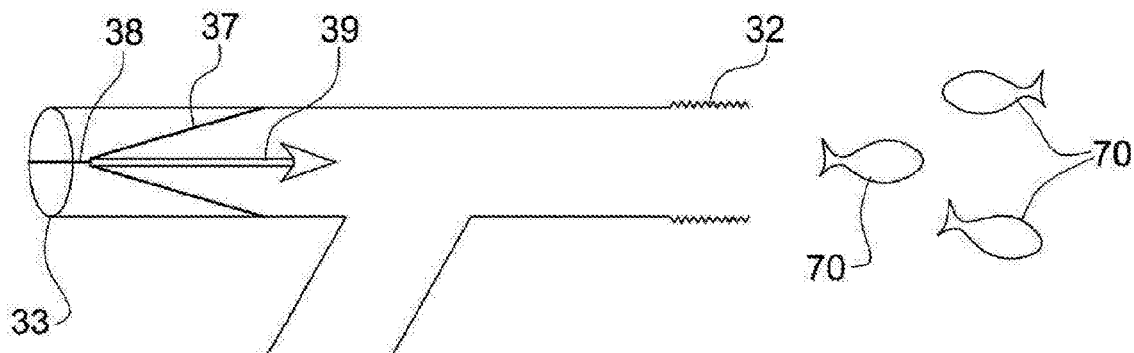
Figure 16:
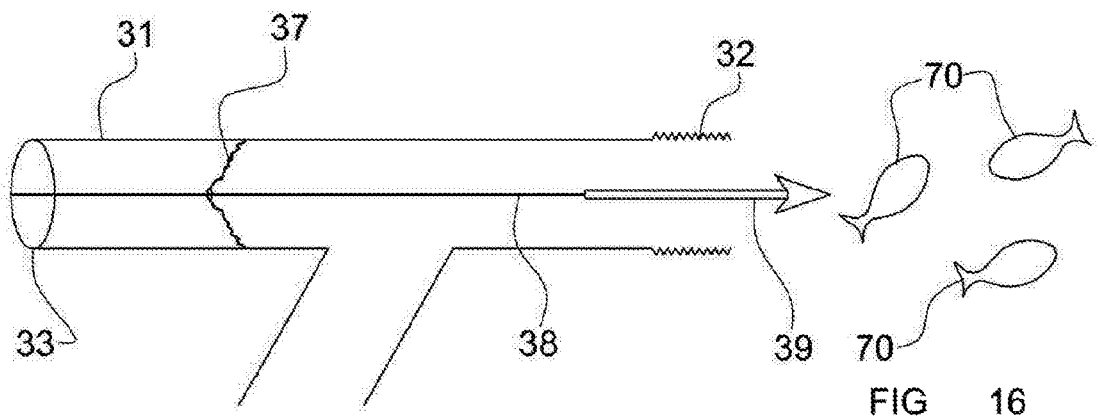
Figure 17:
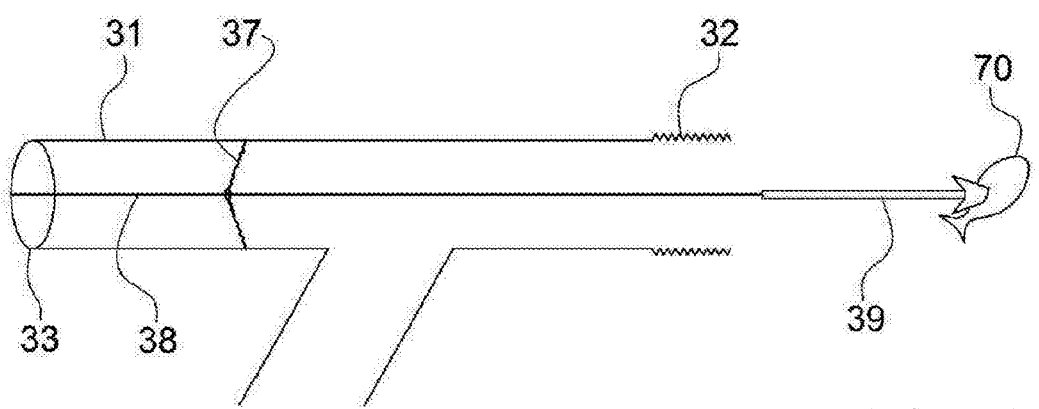
Figure 18:
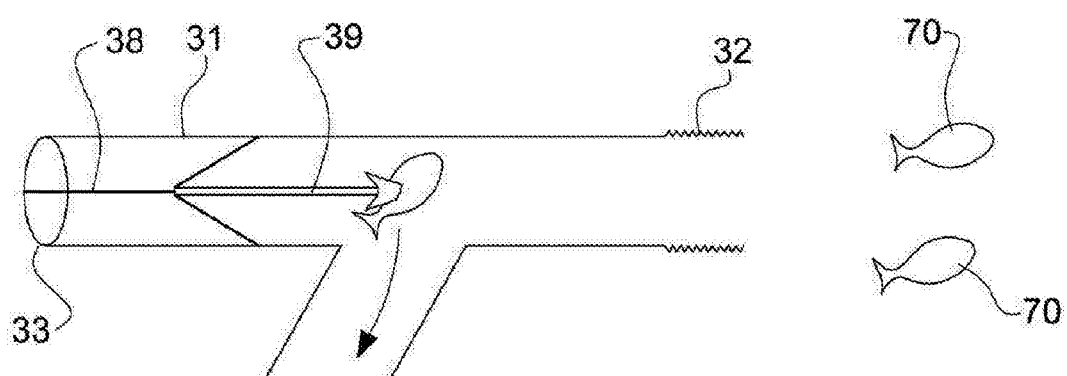

When the surface vessel arrives at a location for harvesting the targeted species, a hoist is attached to the ROV(s) 20 and the ROV(s) 20 are deployed from the surface vessel, for instance by lowering the ROV(s) into the water by a crane or an A-frame launch arrangement. The ROVs 20 are then manoeuvred to the ocean floor or another target site by an operator while a deckhand manages the tethers 26. FIG. 14 illustrates the steps of the method. More details of the method will become apparent to the skilled person from the subsequent description of the system's apparatus.

Focusing now on just one ROV 20, once deployed at step 50 the ROV 20 is used to locate a specific individual fish of the target species at step 51 using the on board camera 23. The ROV 20 is agile and manoeuvrable and responds to commands provided by the operator from the surface vessel via the tether 26. The lights 22 and camera 23 are used to provide the operator with an image of the area around the ROV 20 to assist with positioning the ROV 20 correctly. Other sensors may also be used by the ROV 20 to identify and target the fish. These may be mounted on the ROV 20 and used in combination with the lights 22 and camera 23. Once a fish is located by the operator, the ROV 20 is manoeuvred into position with the mouth opening 32 of the tube 31 in line with the location of the fish at step 52.

Optionally the operator may receive confirmation at step 53 that the fish is in the correct position relative to the ROV 20 for example with a hair-trigger or laser site overlay on the camera image.

When in position, at step 61 the operator releases the catapult 37 to propel the spear 39 from the mouth of the tube towards the fish 70. The propelled spear 39 pulls the catapult chain with it so that the spear 39 may subsequently be retracted. If successful, the fish will be lodged on the head of the spear 39.

Regardless of whether the shot was successful or not, shortly after the catapult 37 is released, the catapult mechanism 37 is retracted or drawn back and the spear 39 is dragged back into the tube. The pair of electrodes are activated, stunning or killing the speared fish. Then, as the spear 39 head passes the side wall of the tube 31 any speared fish are dislodged from the spear 39 and the dislodged fish are sucked through the flap into the container 34 by activating the impeller 31 at step 62. As the catapult mechanism 39 continues to be retracted the catapult mechanism 39 is re-primed or reset, step 64. Thus, the spear 39 is ready to be redeployed again by releasing the catapult 37.

The operator may determine when the cage 34 is full, or this may be determined by a sensor at step 56. If the cage is not full, the process of identifying fish and capturing them with the ROV 20 continues until the area is cleared. If the cage 34 is full or there is a need for the ROV 20 to return to the surface vessel for another reason, the ROV returns to the surface at step 57.

When the cage 34 is full the ROV 20 returns to a surface vessel and the ROV 20 is hoisted from the water onto the deck of the surface vessel. The collection cage 34 and or catch may be removed by manually opening hatch doors on either side of the collection cage and replaced with an empty collection cage 34.

When the ROV 20 is at the surface, a crane hook may be attached to the ROV 20 and the ROV 20 is lifted to the deck of the surface vessel with the cage 34 attached. The cage 34 is opened or removed by deck hands, and emptied or replaced with an empty container 34 at step 58.

The ROV 20 can be immediately returned to the ocean (step 50) to continue collecting more fish of the target species.

Meanwhile, the deck hands can process the fish to prepare them for packaging. After the target species have been boxed, the fish may be processed for storage packaging and shipping for sale. If the target species is a venomous species, e.g. lion fish, the deck hands may take appropriate precautions, such as wearing protective clothing and removing the venomous part of the fish before shipping.

The illumination lights 22 may have a luminous intensity of up to 10000 lux. It has been found that the illumination lights 22 tend to attract fish to the ROV 20. Many of the fish may not be the target species. It has been found that the fish may follow the direction of the lasers 80. Accordingly, prior to targeting a specific fish 70, the operator may isolate a particular fish 70, or group of fish by directing other fish away from the target zone using the controllable lasers 80. Thus, the lasers 80 help to control non-targeted species. The lasers 80 are usually most effective at dawn and dusk but may be effective at other times of day.

In other embodiments, the ROV 20 may be equipped with one or more alternative controllable light sources, in addition to (or instead of) the lasers 80, for guiding or luring other fish away. Different species of fish may be attracted to, or repelled by, different types of light, and the ROV 20 may be fitted with suitable light sources accordingly.

FIGS. 15 to 18 illustrate diagrammatically the steps of locating the tube mouth 32 in line with a fish (FIG. 15), releasing the catapult 37 to propel spear 39 towards a specific fish (FIGS. 16 and 17), to retract the spear 39 (FIG. 18), to push or slide the fish from the spear head and direct the fish through the flap (if present) into the container, resulting in the fish being captured in the cage 34. For simplicity, the tube 31 is drawn without an elbow and the spear 39 is along the central axis of the tube 31. The skilled person will understand that the diagrams are for illustration purposes only and that the steps in the method could be carried out by the apparatus described herein.

As noted above, several ROVs 20 may be operated in the same harvesting area or adjacent harvesting areas from the same surface vessel.

The ROVs 20 may be powered and controlled from the surface vessel via the tether 26. Thus, the ROVs 20 can effectively operate for extended periods of time. When a particular location has been cleared of substantially cleared of the target fish species, the ROVs 20 may be returned to the surface and hoisted onto the deck of the surface vessel so that the whole operation may relocate. In an alternative arrangement, the ROVs 20 may be operated without a tether attached to a surface vessel, for example using 'wireless' signals.

As the fish are identified visually or by other means by an operator, the system can be used to collect a specific fish species and thereby manage the population of the species effectively.

Figure 20:
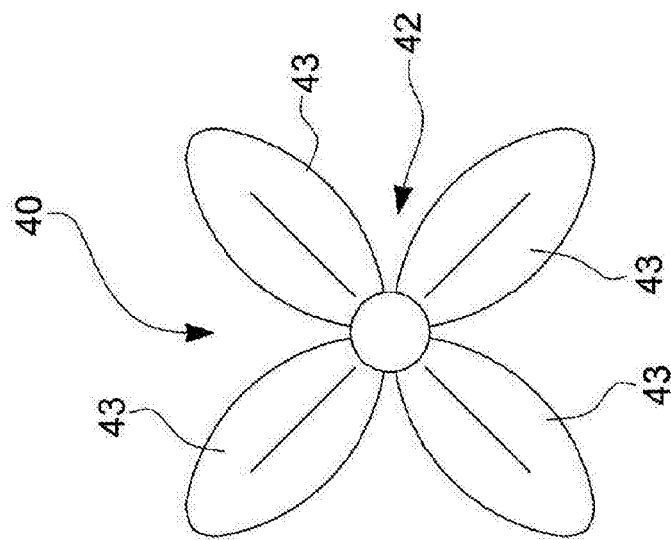
FIGS. 19 to 21 illustrate a grab tool.
Figure 19:
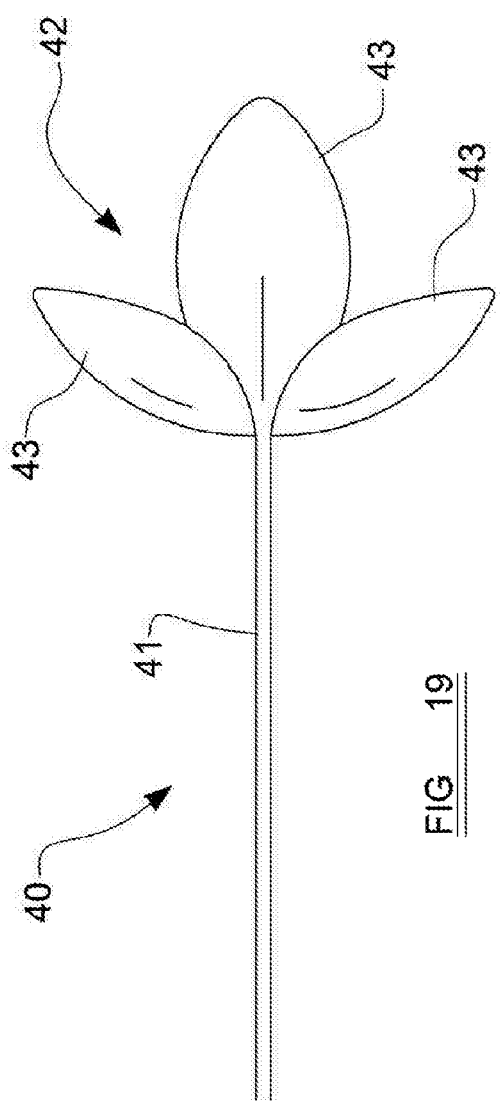
Figure 21:
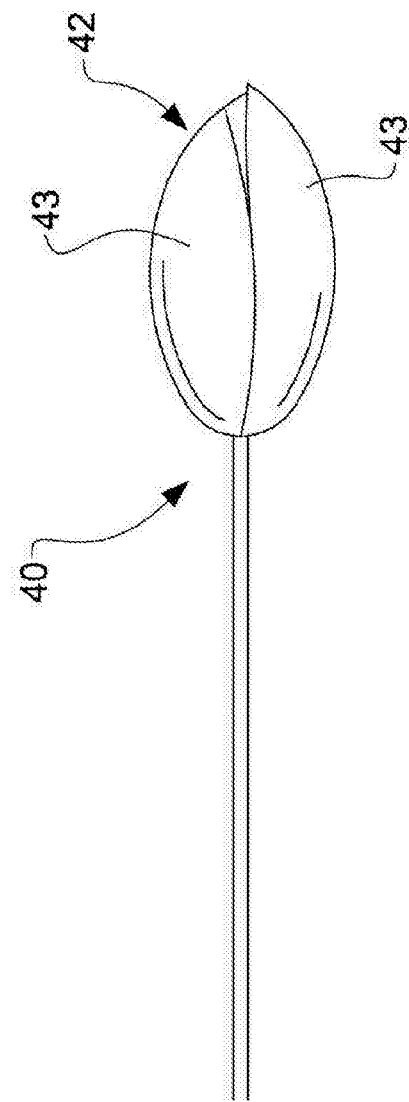

In an alternative arrangement, the spear 39 may be replaced with a grab tool 40. FIGS. 19 to 21 illustrate a grab tool 40. The grab tool 40 has a stem 41 and a head 42. The head 42 comprises a number of 'petals' 43. Each of the petals 43 are attached to the head 42 by a pin or hinge. The pin or hinge allows each of the petals 43 to rotate by up to 180°. Thus, the petals 43 are movable between an open position (akin to an open flower— FIGS. 19, 20) and a closed position (akin to a flower bud—FIG. 21). The grab tool 40 may be attached to the line 38 and loaded in the catapult 37 with the end of the stem 41 distal to the head 42 in the holder/bucket, similarly to the spear 39.

When the catapult 37 is released 61, the grab tool 40 is deployed from the end of the tube 31. The direction of movement of the grab tool 40 through the water causes the petals 43 to open. Thus, when the grab tool 40 is deployed the petals 43 may surround a fish 70.

When the grab tool 40 is drawn back into the tube 31 the direction of movement of the grab tool 40 through the water causes the petals 43 to close. Thus, the grab tool 40 may capture a fish 70.

Once the head 42 is inside the month 32 of the tube 31, the petals 43 are allowed to reopen. Thus the fish 70 is released inside the tube 31, and thus the fish may pass into the collection cage 34.

Using a grab tool 40 as an alternative to a spear 39 has the advantage that there is less damage to the fish 70 when capturing (if the grab tool is correctly designed and positioned with respect of the fish).

In an alternative method, in depths which are accessible by divers, the ROV 20 may be accompanied by a diver. The diver may operate the ROV 20 from under water and visually identify the target species. In another arrangement, the ROV may be substituted for a manned vehicle operated by an in-vehicle diver. In some circumstances it may be unnecessary to tether the ROV to a surface vessel.

In an alternative arrangement, the cage 34 may be replaced by a container or holding bag. This arrangement would be particularly useful in situations where the cage 34 presents a hazard, for example to environmental features in the harvesting area.

The ROV 20 may be modified to include additional tools, such as sensors and/or sonar. These could be used to assist with the method. For example, sonars could be used to assist with locating the target species. Once the ROV 20 arrives at the identified location, the fish could then be verified using visual identification.

Alternatively, to visual confirmation, object identification software could be used to locate and confirm the identity of the target species.

In an alternative arrangement, the ROVs 20 may carry battery packs and be operated by a remote control means rather than being tethered to the surface vessel.

The ROVs according to the present application may be relatively small in size. Accordingly, in order to operate, deploy and process the ROVs, a small area of deck is required. Furthermore, smaller generators to provide power to the ROVs may be used. Accordingly, it is possible to use up to four machines from a single surface vessel whereas, by comparison, only one pair of ROVs could be used in previous systems. This represents a significant advantage and gain in efficiency and use of resources compared with prior systems.

When used in this specification and the claims, the term "comprises" and "comprising" and variations thereof mean that specified features, steps or integers and included. The terms are not to be interpreted to exclude the presence of other features, steps or compounds.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realising the invention in diverse forms thereof.

The invention claimed is:

1. A submersible for capturing a target species comprising:
   a frame;
   one or more thrusters mounted at a back or sides of the frame for manoeuvring the submersible;
   at least one camera connected to the frame for capturing images to allow an identification of an individual of the target species;
   a releasable retractable device;
   a catapult mechanism mounted to the frame, the catapult mechanism being reversibly moveable between a released configuration and a primed configuration by an activatable motor, the catapult mechanism both being configured to be loaded with the releasable retractable device and comprising a clutch and trigger mechanism, the retractable device being attached to a rack of the catapult mechanism and being launchable from the submersible by being propelled by the catapult mechanism; and
   a container for receiving a captured individual of the target species;
   wherein the catapult mechanism comprises:
   (a) a rack housing for holding the releasable retractable device;
   (b) an elastic member for propelling the retractable device, and
   (c) a pinion gear set comprising a drive gear and a pinion gear, the pinion gear set being configured to be driven through the drive gear by a drive motor; and
   wherein,
   (a) when driven starting from the released configuration, the pinion gear engages with the rack to draw back the retractable device and as the rack transitions from the released configuration to the primed configuration the elastic member is stretched and stores potential energy, (b) as the catapult mechanism approaches the primed configuration the trigger mechanism engages with a release mechanism, (c) the clutch is configured to interact with the pinion gear set to disengage the pinion gear from the rack, thereby readying the catapult mechanism to fire, and (d) the rack is releasable to allow the catapult mechanism to move from the primed configuration to the released configuration by disengaging the trigger mechanism and the release mechanism, thereby allowing the elastic member to propel the retractable device.

2. A submersible according to claim 1, wherein the catapult mechanism passes through a side of a tube structure connected to the frame, and a captured individual of the target species may be carried by the retractable device into the tube structure.

3. A submersible according to claim 2, wherein an axis of the tube structure at a mouth opening of the tube structure is angled in a downward direction relative to the frame, wherein the angle is between 30° and 60°.

4. A submersible according to claim 2, further comprising an impeller in fluid communication with the tube structure, wherein when activated the impeller creates a fluid flow due to a pressure potential.

5. A submersible according to claim 1, further comprising at least one directionally controllable laser connected to the frame.

6. A submersible according to claim 1, wherein the retractable device is a spear having a spear head, optionally wherein the spear has barbs.

7. A system for controlling a target species comprising:
the submersible according to claim 1; and
wherein the submersible is deployed in a target area for capturing individuals of the target species.

8. The submersible of claim 1, wherein the pinion gear set further comprises at least one idler gear between the drive gear and the pinion gear.

9. A method of capturing a target species using a submersible, wherein the method comprises the steps of:
providing a submersible comprising:
(a) a frame;
(b) one or more thrusters mounted at a back or sides of the frame for manoeuvring the submersible;
(c) at least one camera connected to the frame for capturing images to allow an identification of an individual of the target species;
(d) a releasable retractable device;
(e) a catapult mechanism mounted to the frame, the catapult mechanism being reversibly moveable between a released configuration and a primed configuration by an activatable motor, the catapult mechanism both being configured to be loaded with the releasable retractable device and comprising a clutch and trigger mechanism, the retractable device being attached to a rack of the catapult mechanism and being launchable from the submersible by being propelled by the catapult mechanism; and
(f) a container for receiving a captured individual of the target species;
wherein the catapult mechanism comprises:
(i) a rack housing for holding the releasable retractable device;

(ii) an elastic member for propelling the retractable device, and
(iii) a pinion gear set comprising a drive gear and a pinion gear, the pinion gear set being configured to be driven through the drive gear by a drive motor; and
wherein,
(a) when driven starting from the released configuration, the pinion gear engages with the rack to draw back the retractable device and as the rack transitions from the released configuration to the primed configuration the elastic member is stretched and stores potential energy,
(b) as the catapult mechanism approaches the primed configuration the trigger mechanism engages with a release mechanism,
(c) the clutch is configured to interact with the pinion gear set to disengage the pinion gear from the rack, thereby readying the catapult mechanism to fire, and
(d) the rack is releasable to allow the catapult mechanism to move from the primed configuration to the released configuration by disengaging the trigger mechanism and the release mechanism,
thereby allowing the elastic member to propel the retractable device;
loading the catapult mechanism with the retractable device and moving the catapult mechanism to the primed configuration;
manoeuvring the submersible into position wherein the primed catapult mechanism is substantially aligned with a body of an individual of the target species;
releasing the primed catapult mechanism and retractable device, to attempt capture of the individual of the target species; and
drawing back the catapult mechanism and retractable device, wherein if the capture attempt is successful the retractable device carries the captured individual of the target species to the submersible and the captured individual is dislodged and contained within the submersible.

10. A method of capturing a target species using a submersible according to claim 9, wherein the catapult mechanism and retractable device are disengaged released by releasing the trigger mechanism from the release mechanism.

11. A method of capturing a target species using a submersible according to claim 9, wherein the step of drawing back the catapult mechanism begins by activating the drive motor and continues until the catapult mechanism is re-primed and held by a trigger hook of the trigger mechanism engaging with a holding pin of the release mechanism.

12. A method of capturing a target species using a submersible according to claim 9, further comprising a step of stunning or killing the captured individual using a pair of electrodes located within a tube structure.

13. A method of capturing a target species using a submersible according to claim 9, wherein the step of dislodging the captured individual is automatically carried out by the catapult mechanism moving relative to the submersible when the retractable device is drawn back to the submersible.

14. A method of capturing a target species using a submersible according to claim 9, wherein the step of manoeuvring the submersible into position, or deciding when to release the primed catapult mechanism is assisted by using at least one controllable laser connected to the frame.

\* \* \* \* \*